United States Patent
Neal et al.

(10) Patent No.: US 10,155,580 B1
(45) Date of Patent: Dec. 18, 2018

(54) BALL-LOCK FASTENING DEVICE

(71) Applicant: NORTHROP GRUMMAN SYSTEMS CORPORATION, Falls Church, VA (US)

(72) Inventors: Matthew A. Neal, Lancaster, CA (US); Stephen R. Berg, Lancaster, CA (US); Michael J. Ehrlich, Palmdale, CA (US); Charles R. Smith, Acton, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 15/788,084

(22) Filed: Oct. 19, 2017

Related U.S. Application Data

(62) Division of application No. 14/804,171, filed on Jul. 20, 2015, now Pat. No. 9,845,143.

(51) Int. Cl.
| | |
|---|---|
| *B64C 1/14* | (2006.01) |
| *F16B 21/16* | (2006.01) |
| *E05C 17/58* | (2006.01) |
| *F16B 1/00* | (2006.01) |
| *F16B 19/10* | (2006.01) |
| *F16B 21/14* | (2006.01) |

(52) U.S. Cl.
CPC ............ *B64C 1/1446* (2013.01); *E05C 17/58* (2013.01); *F16B 21/165* (2013.01); *F16B 1/005* (2013.01); *F16B 1/0057* (2013.01); *F16B 19/109* (2013.01); *F16B 2001/0035* (2013.01); *F16B 2021/14* (2013.01)

(58) Field of Classification Search
CPC ................... F16B 21/165; F16B 21/16; F16B 2001/0035; F16B 2/16; Y10T 292/14; Y10T 24/45487; Y10T 292/0815; Y10T 403/592; E05Y 2900/502; E05B 63/121; E05B 17/2011; E05B 51/02; B23B 31/1071
USPC ........................................................ 292/156
See application file for complete search history.

(56) References Cited

U.S. PATENT DOCUMENTS

| | | |
|---|---|---|
| 3,430,305 A | 3/1969 | Geffner |
| 3,608,937 A | 9/1971 | Nave |
| 3,827,110 A | 8/1974 | Dzus, Sr. et al. |
| 4,016,914 A | 4/1977 | Zurko |
| 4,586,425 A | 5/1986 | Redman et al. |
| 4,647,089 A | 3/1987 | Zangrando |
| 4,759,671 A | 7/1988 | Duran |
| 4,863,205 A | 9/1989 | Schron et al. |
| 5,160,180 A | 11/1992 | Mlynarczyk |
| 5,224,806 A | 7/1993 | Duran |
| 5,267,760 A | 12/1993 | Carlin |

(Continued)

FOREIGN PATENT DOCUMENTS

NL     1018734 C1     10/2001

*Primary Examiner* — Mark A Williams
(74) *Attorney, Agent, or Firm* — John A. Miller; Shumaker, Loop & Kendrick, LLP

(57) ABSTRACT

A ball-lock type fastening device for connecting a work piece to a structure is disclosed. The fastening device includes a number of features designed to improve the reliability, repeatability and strength of the locking mechanism compared to traditional ball-lock fasteners. The features include the shape of the locking balls, the shape of the retention housing which engages the locking balls, and mechanisms for controlling deployment and retraction of the locking balls.

14 Claims, 4 Drawing Sheets

(56) References Cited

U.S. PATENT DOCUMENTS

| | | | |
|---|---|---|---|
| 5,452,979 A | | 9/1995 | Cosenza |
| 5,704,661 A | * | 1/1998 | Takimoto ............ E05B 65/0864 |
| | | | 292/162 |
| 5,765,883 A | | 6/1998 | Dessenberger et al. |
| 5,779,288 A | | 7/1998 | Amelio |
| 5,803,689 A | | 9/1998 | Magnus et al. |
| 5,918,870 A | | 7/1999 | Stark |
| RE36,351 E | | 10/1999 | Yamamoto et al. |
| 6,077,011 A | | 6/2000 | Walker |
| 6,199,798 B1 | | 3/2001 | Stephan et al. |
| 6,350,095 B1 | | 2/2002 | Gross et al. |
| 6,641,343 B1 | | 11/2003 | Duran |
| 6,948,685 B2 | | 9/2005 | Hawthorne |
| 7,255,376 B2 | | 8/2007 | Pratt et al. |
| 7,578,475 B2 | | 8/2009 | Pratt et al. |
| 8,056,862 B1 | | 11/2011 | Tomerlin et al. |
| 8,453,973 B2 | | 6/2013 | Costabel |
| 8,529,151 B2 | | 9/2013 | Blanchard |
| 8,920,063 B1 | * | 12/2014 | Easley .................. F16B 21/165 |
| | | | 269/48.1 |
| 8,960,734 B2 | | 2/2015 | Camp |
| 9,303,674 B2 | | 4/2016 | Demmeler |
| 9,567,774 B1 | * | 2/2017 | Neal ..................... F16B 19/109 |
| 9,845,143 B2 | * | 12/2017 | Neal ..................... B64C 1/1446 |
| 2003/0170074 A1 | | 9/2003 | Mills et al. |
| 2010/0150648 A1 | | 6/2010 | Judge et al. |
| 2012/0013133 A1 | * | 1/2012 | Rios, III ............... E21B 33/038 |
| | | | 292/159 |
| 2012/0054998 A1 | | 3/2012 | Tschida et al. |
| 2012/0112003 A1 | | 5/2012 | Affre De Saint Rome |
| 2013/0305497 A1 | | 11/2013 | Coman |
| 2013/0330120 A1 | | 12/2013 | Blanchard |
| 2015/0354615 A1 | | 12/2015 | Tchouangueu |

* cited by examiner

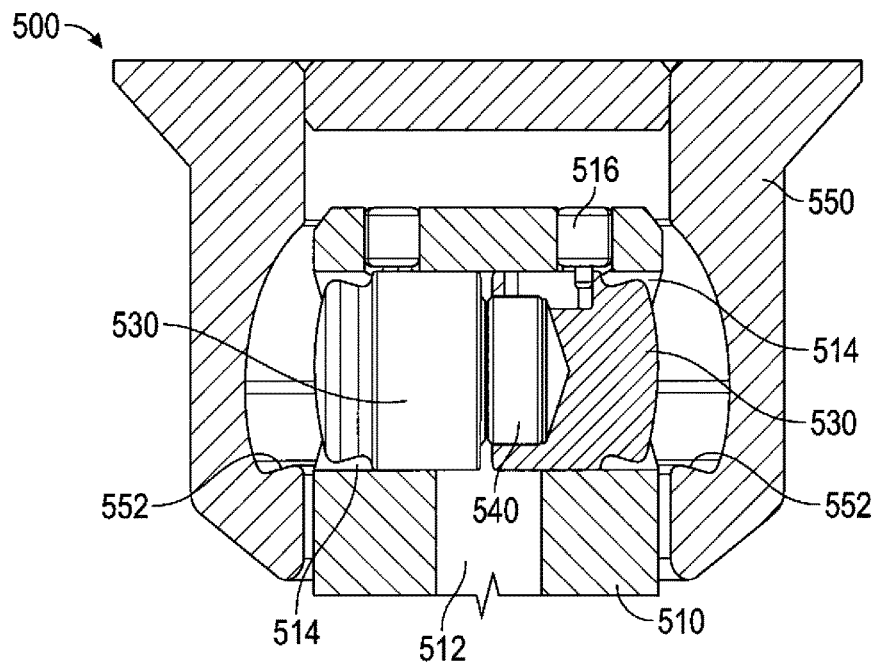
FIG. 6
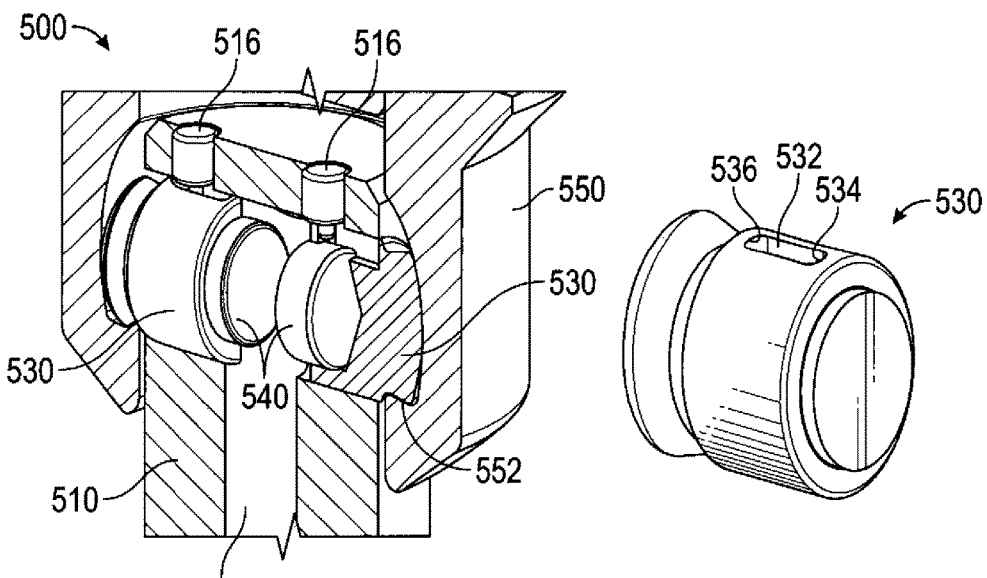
FIG. 7
FIG. 8

# BALL-LOCK FASTENING DEVICE

CROSS-REFERENCE TO RELATED APPLICATIONS

This application is a divisional application of U.S. patent application Ser. No. 14/804,171 filed Jul. 20, 2015, titled "Advanced Lock Design for Ball-Lock Devices."

BACKGROUND

Field

This invention relates generally to a fastening device and, more particularly, to a ball-lock type fastening device for connecting a work piece to a structure, where the device includes a number of features designed to improve the reliability, repeatability and strength of the locking mechanism, and where the features include the shape of the locking balls, the shape of the retention housing which engages the locking balls, and mechanisms for controlling deployment and retraction of the locking balls.

Discussion

Various industries, including aviation, general construction, electronics, and general manufacturing, use fasteners for a number of different purposes. For example, the aviation industry may find it desirable to quickly, reliably, and robustly attach Outer Mold Line ("OML") frequently-accessed panels and doors to an aircraft's structural frame. The fastening methods used to attach these OML panels and doors should be secure and capable of avoiding undesired and/or accidental detachment (e.g., during flight). In certain aviation applications, it may also be desirable to reduce aerodynamic drag by using fasteners that hold these OML panels and doors from underneath, thereby avoiding protrusions or penetrations through the OML of the panel or door. In this situation, a fastener could be associated with the structural beam and actuated from beneath the panel to grab or grasp the panel, when actuated.

Panel fasteners may be designed for an initial actuation or installation by a user to a particular clamp-up force. Due to the desire for reliable service, panel fasteners in certain use environments, such as aviation, might then be designed to hold the initial clamp-up force without further application of energizing force until such time as a de-energizing force is positively applied by the user to facilitate selective panel removal.

Panel fasteners have been developed which hold the panel from underneath, as described above, including a fastener which holds the panel from underneath and which is fully retractable into the supporting structure when in the unlatched position. These panel fasteners include ball-lock type fasteners with a shaft or spindle for separating the locking balls, and pneumatically-driven fasteners. However, further design optimizations are still possible, and disclosed herein, adding features which improve the reliability, repeatability and strength of the fastener's locking mechanism.

SUMMARY

In accordance with the teachings of the present invention, a ball-lock type fastening device for connecting a work piece to a structure is disclosed. The fastening device includes a number of features designed to improve the reliability, repeatability and strength of the locking mechanism compared to traditional ball-lock fasteners. The features include the shape of the locking balls, the shape of the retention housing which engages the locking balls, and mechanisms for controlling deployment and retraction of the locking balls.

Additional features of the present invention will become apparent from the following description and appended claims, taken in conjunction with the accompanying drawings.

BRIEF DESCRIPTION OF THE DRAWINGS

FIG. 6 is a cross-sectional illustration of an upper end of a fastener of the type shown in FIG. 3, where the fastener includes locking pills having a shape which engages with a corresponding ridge or lip on the retention housing;

FIG. 7 is a cross-sectional illustration of the upper end of the fastener of FIG. 6, in a locked configuration where the locking pills have deployed outward and engaged with the lip on the retention housing; and FIG. 8 is an illustration of one of the locking pills from the fastener of FIGS. 6 and 7, where the locking pill includes magnetic retraction, and a pin/slot feature in the top of the locking pill to control operational travel.

DETAILED DESCRIPTION OF THE EMBODIMENTS

The following discussion of the embodiments of the invention directed to an advanced lock design for ball-lock devices is merely exemplary in nature, and is in no way intended to limit the invention or its applications or uses. For example, some embodiments discussed below are described in the context of an access panel on an aircraft. However, the disclosed fastener design features are also suitable for use in any other application where a ball-lock fastener is needed—such as automotive, military vehicles, machinery, building construction, etc.

Figure 1:
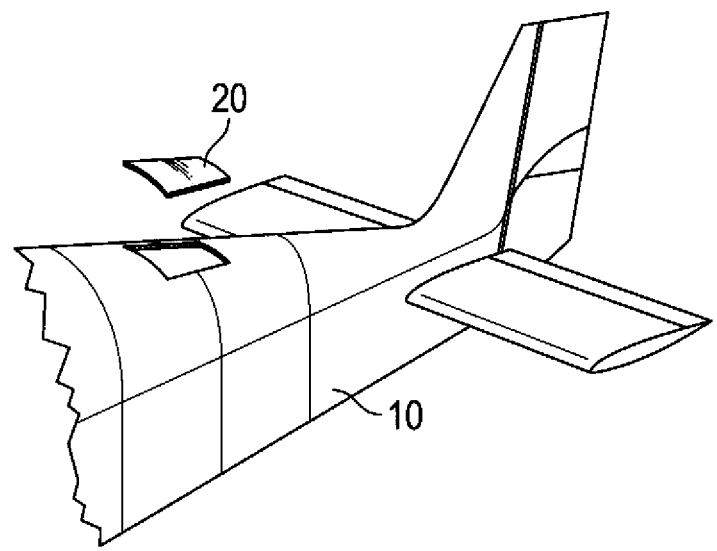
FIG. 1 is an illustration of an aircraft fuselage with a typical access panel shown removed from the fuselage.

FIG. 1 is an illustration of a portion of a fuselage and tail section of an aircraft 10 with an access panel 20 shown removed from the fuselage of the aircraft 10. The access panel 20 could be located anywhere on the aircraft 10—such as on the fuselage, the wing, the tail, etc. The access panel 20 is intended to be removable for access to interior components, most commonly for service or inspection. The panel 20 must be able to be securely fastened in place on the aircraft 10, including the ability to withstand flight loads, vibration, etc.

In order to maintain a completely clean outer surface of the panel 20 for minimum aerodynamic drag, it is desirable to fasten the panel 20 onto the aircraft 10 with fasteners which grasp the panel 20 from underneath. One such bottom-grasping fastener uses strong magnets placed over the fastener location to unlatch ball-lock components of the fastener. However, this design requires precise placement of the external magnets over the internally-located fasteners, which can be difficult to achieve, and may require more than one person to accomplish. Another bottom-grasping fastener simply employs a magnetic attachment of the panel 20 to the aircraft 10, with an inflatable "inner-tube" used to break the magnetic grip and detach the panel 20. However, with large panels, this design requires a large and cumbersome inner-tube. Furthermore, if the inner-tube should develop a leak, it would be very difficult to pry the panel 20 off of the aircraft 10, likely resulting in damage to both.

Another known type of quick-release fastener is a ball-lock type fastener. Commonly, ball locks are used to operate quick release components and fasteners. Ball locking mechanisms are well known in numerous fields of application. They enable the release and reattachment of two components by the use of a bore which contains a partially protruding locking ball or sphere. Such ball locking mechanisms usually work on a spring-loaded ball design or the use of a spindle to engage/wedge the retention balls into their designated locking groves. Many ball-lock fastener designs are known to have deficiencies in strength and reliability, and as such are typically not suitable for critical aircraft applications such as external access panels.

Other types of access panel fasteners have also been developed, but none offer the desired combination of bottom-grasping, simple actuation, high reliability, built-in clamping pre-load of the panel 20 onto the aircraft 10, and full retractability of the fastener inside the supporting structure. This last feature—retractability—is discussed further below.

Figure 2:
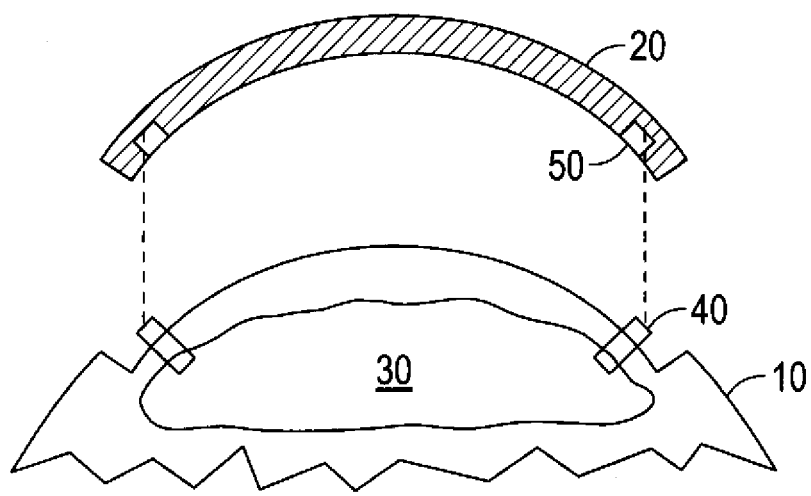
FIG. 2 is a cross-sectional illustration of a curved access panel which shows the problem with traditional bottom-grasping fasteners which do not retract into the supporting structure.

FIG. 2 is an illustration of the access panel 20 in an end-view as if a section were cut through the fuselage of the aircraft 10. FIG. 2 shows the aircraft 10, the access panel 20, a supporting structure portion of the aircraft 10 generally indicated at 30, fasteners 40 and recesses 50 in the panel 20. FIG. 2 illustrates a limitation which exists with the traditional bottom-grasping fastener 40 which does not retract into the supporting structure 30.

Consider a design of the panel 20 which uses four of the fasteners 40—one located near each corner of the panel 20. Two of the fasteners 40 are visible in FIG. 2, while the other two of the fasteners 40 would be located directly behind the two shown. Each of the fasteners 40 must be inserted into one of the recesses 50 in the panel 20, after which a ball-lock or some other feature of the fastener 40 can be actuated to lock the fastener 40 into the recess 50, thereby securing the panel 20 onto the aircraft 10. If the panel 20 is flat, or nearly flat, it is possible to lower the panel 20 down into position against the aircraft 10 while simultaneously fitting all of the recesses 50 over the fasteners 40. This lowering of the panel 20 into position is possible even if the fasteners 40 do not retract into the supporting structure 30, but only if the panel 20 is essentially flat.

However, if the panel 20 is highly curved, as is the case in FIG. 2, the panel 20 cannot be lowered into position if the fasteners 40 do not retract into the supporting structure 30. As can be seen in FIG. 2 and readily understood by one skilled in the mechanical arts, the non-retractable fasteners 40 will interfere with the material surrounding the recesses 50, thereby preventing the panel 20 from being lowered into position. For an access panel 20 which is highly curved, a fastener design is needed which fully retracts into the supporting structure 30, allowing the access panel 20 to be freely placed into position, after which the fastener extends into and latches onto the panel 20.

Figure 3:
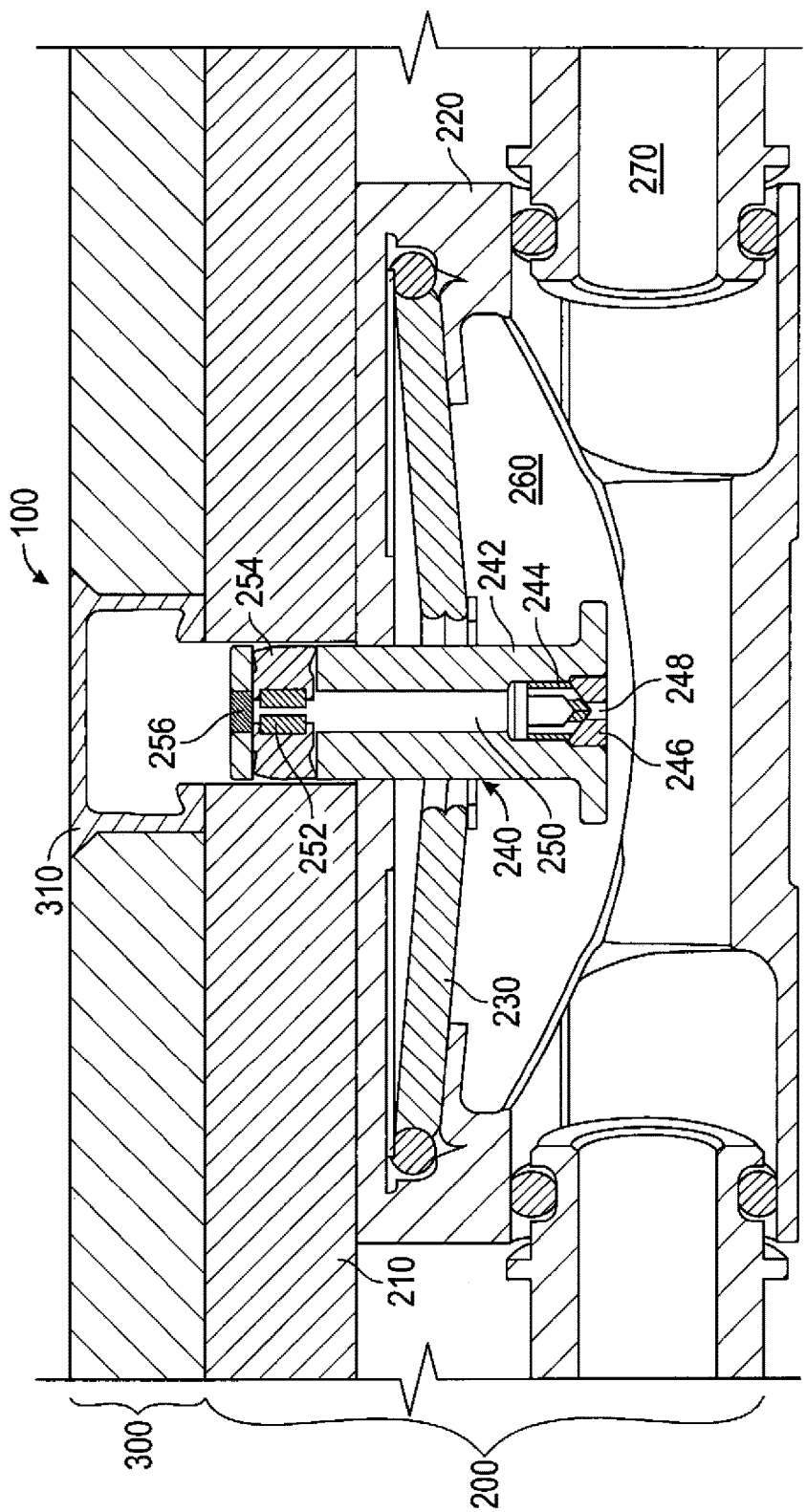
FIG. 3 is a cross-sectional illustration of an access panel fastener in an unlatched condition where the fastener is fully retracted into its supporting structure.

FIG. 3 is a cross-sectional illustration of a fastener 100 which offers full retractability, bottom-grasping, simple and rapid actuation for both latching and unlatching, high reliability and built-in clamping pre-load. FIG. 3 shows the fastener 100 in a first position, where the device is fully retracted and unlatched. The design and operation of the fastener 100 of FIG. 3 was described in U.S. patent application Ser. No. 14/713,225, titled "RAPID PANEL ACCESS FASTENER FOR HIGHLY CURVED PANELS", filed 15-May-2015, assigned to the assignee of the present application, and hereby incorporated by reference in its entirety.

The term "pneumatically-actuated" is used herein to indicate that the fastener 100 is selectively actuated, in at least one embodiment, using pneumatic power provided by pressurized air, nitrogen, or some other gas. It should be understood, however, that hydraulic power, using hydraulic oil, water, or any other suitable fluid for a particular use environment, may also be employed without deviating from the basic design principles of the fastener 100.

References to the fastener 100 will henceforth describe the entire fastener assembly, including those components which are mounted to a fixed structure 200, and those components which are incorporated into a removable panel 300. For comparison to FIGS. 1 and 2, the fixed structure 200 corresponds to the aircraft 10 and the supporting structure 30, and the removable panel 300 corresponds to the access panel 20. For visual clarity, some element numbers may be omitted from various of the figures, but should be understood to be analogously applicable to all figures where a particular numbered element is present.

The relative terms "lower" and "upper", "down" and "up", etc., are used herein to refer to directions toward the bottom and top, respectively, of FIG. 3 and similarly oriented figures. No absolute direction is implied or intended by use of these directional terms, beyond orienting the description herein, and one of ordinary skill in the art will be readily able to re-orient to a fastener 100 which is not configured in space as shown in the figures.

The fastener 100 includes an upper housing 210 and a lower housing 220, which are part of the fixed structure 200. The lower housing 220 fixes a Belleville spring 230 around its periphery. A piston assembly 240 is disposed through a central aperture in the Belleville spring 230, such that the piston assembly 240 can slide up and down through the Belleville spring 230 and through an opening in the upper housing 210. Below the lower housing 220, the Belleville spring 230 and the piston assembly 240 is a chamber 260. The chamber 260 is in fluid communication with a pneumatic line 270, through which pneumatic pressure is selectively provided, as will be discussed in detail below.

It is to be understood that the pneumatic pressure in the pneumatic line 270 is provided by a pneumatic supply system including at least one pump or compressor, a tank or plenum, and at least one valve. None of the elements of the pneumatic supply system are shown in FIG. 3 or subsequent figures, as these elements would be clearly understood by one skilled in the art, and are not germane to the design of the fastener 100. It is also to be understood that multiple units of the fastener 100 can be coupled to the pneumatic line 270—so that all of the fasteners 100 used on a particular access panel can be simultaneously latched or unlatched with the prescribed sequence of pneumatic pressures.

The piston assembly 240 includes a piston body 242, a valve 244, and a magnetic seat 246. The magnetic seat 246 includes a central opening 248, which is open at the bottom to whatever pneumatic pressure exists in the chamber 260. The piston body 242 includes a central passage 250 extending from one end of the piston body 242 to the other end. When the valve 244 is lifted off of the magnetic seat 246, pneumatic pressure from the chamber 260 passes through the opening 248 in the magnetic seat 246 and into the central passage 250. The piston assembly 240 also includes a plurality of magnetic pills 252, each of which is coupled to a locking dog 254. Two each of the pills 252 and dogs 254 are shown in the figures; however, more could be used. The pills 252 and dogs 254 are shown retracted within the piston assembly 240 in FIG. 3, but deploy radially outward for latching, as will be discussed below. The magnetic pills 252 are held in a retracted position by a top magnet 256 which is fitted into the upper end of the piston body 242. The magnetic pills 252 may also be held in a retracted position by their magnetic attraction to each other, and the top magnet 256 may be replaced by a non-magnetic bumper which serves to keep the magnetic pills 252 centered within the piston body 242 when retracted.

The removable panel 300 includes a retainer cavity 310, into which the upper end of the piston body 242 travels during the latching sequence. The retainer cavity 310 has a profile shape which is designed to correspond to the profile of the locking dogs 254, such that the dogs 254 can pull down on the panel 300 and in this condition the dogs 254 are prevented from retracting radially back into the piston assembly 240. This feature is shown in later figures and discussed below.

In the following discussion, a "positive" pressure is above a resting pressure (e.g., the atmospheric pressure of about 14.7 pounds per square inch, or about 101 kiloPascals, will be a resting pressure in many use environments, though resting pressure may vary somewhat, depending on altitude, ambient temperature, and other contributory factors). Specific pneumatic pressure values cited below are exemplary of one embodiment which has been demonstrated to operate as described. All pressures should be understood to be within a reasonable range of the cited values—such as +/−5-10 psi.

In FIG. 3, the fastener 100 is shown in a fully retracted and unlatched position. At this point, there is no pneumatic pressure (that is, no positive pressure above ambient) in the chamber 260. As discussed at length above, the ability of the fastener 100 (specifically the piston assembly 240) to fully retract within the housings 210/220 is critical for applications where the removable panel 300 is highly curved. As shown in FIG. 3, the panel 300 is placed in position on the upper housing 210, but the panel 300 is not fastened in any way to the underlying fixed structure 200.

From the configuration shown in FIG. 3, the fastener 100 is latched by applying a latching sequence of pneumatic pressures as follows. First, a series of increasing pneumatic pressures is provided in the chamber 260, causing the piston assembly 240 to deploy upward, the Belleville spring 230 to deflect upward and the pneumatic pressure to separate the locking dogs 254 and drive them outward into the retainer cavity 310. Then the pneumatic pressure is removed in stages, causing the Belleville spring 230 to partially relax and the extended locking dogs 254 to catch on a lip of the retainer cavity 310. The fastener 100 is then fully latched with a clamping preload, with no pneumatic pressure required.

From the latched configuration described above, the fastener 100 is unlatched by applying an unlatching sequence of pneumatic pressures as follows. First, a pneumatic pressure is provided in the chamber 260 sufficient to cause the Belleville spring 230 to deflect upward, but insufficient to open a valve in the piston assembly 240 and apply a separating pressure on the locking dogs 254. At this stage, the locking dogs 254 are released from the lip of the retainer cavity 310 and retract back into the piston assembly 240. Then the pneumatic pressure is removed in stages, causing the Belleville spring 230 to relax and the piston assembly to retract back down into the fixed structure 200. The fastener 100 is then fully unlatched and retracted, with no pneumatic pressure in the chamber 260.

The detailed discussion of the fastener 100, above, is provided because the operation of this type of fastener must be understood to provide the contextual background for the design features of the present invention, discussed below. In particular, numerous new design features have been incorporated into components in the upper portion of the fastener 100—in order to improve the strength and reliability of fasteners used for aircraft access panels or other critical applications, while simultaneously decreasing the size and weight of the fastener.

Figure 4:
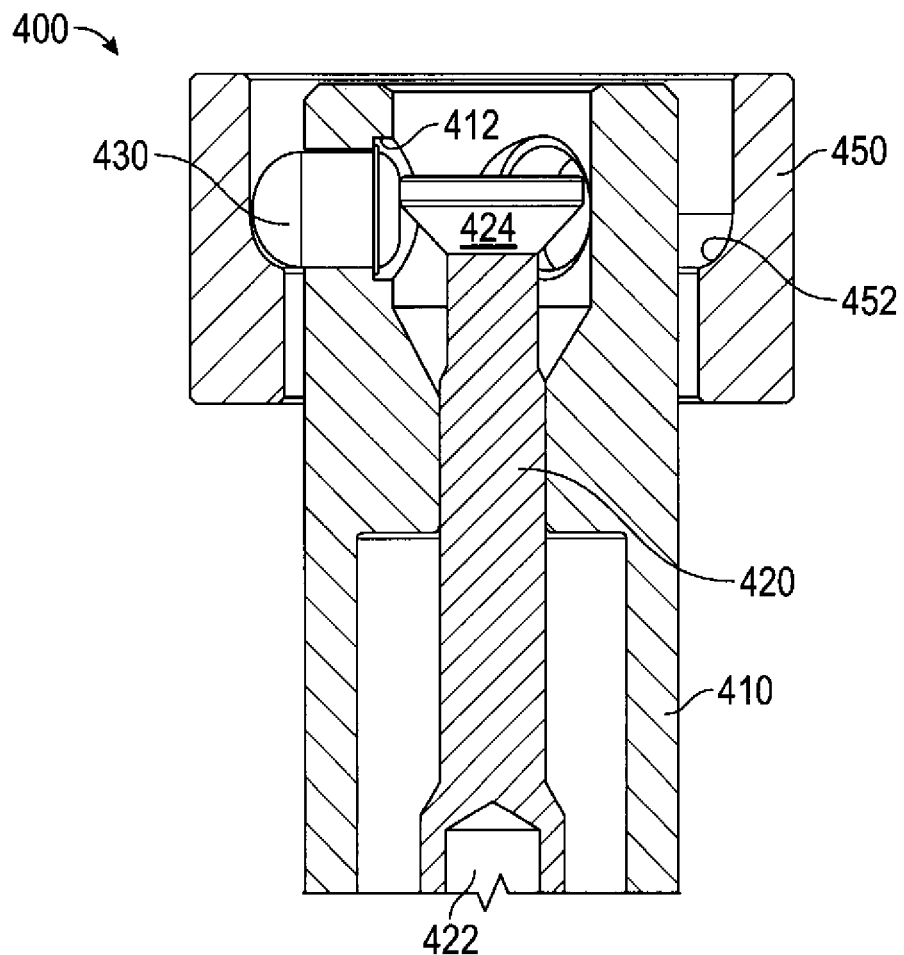
FIG. 4 is a cross-sectional illustration of a fastener of the type shown in FIG. 3, where the fastener includes vertically-elongated locking pills in the locking mechanism.

FIG. 4 is a cross-sectional illustration of a fastener 400, generally of the type of the fastener 100 shown in FIG. 3, where the fastener 400 includes elongated locking pills in the locking mechanism. Typical locking ball fasteners use round locking balls which are driven outward from a piston to engage with the component to be locked. However, round locking balls suffer from some inherent limitations, including limited shear strength, and the ability to spin about any axis under load which compromises locking.

The fastener 400 is generally similar to the fastener 100 of FIG. 3 in that the fastener 400 includes a piston 410 which deploys upward into a retainer cavity 450. However, instead of pneumatically-actuated pills, the piston 410 includes a spindle 420 slidably mounted therein, where the spindle 420 can be moved axially within the piston 410 to either a position where a plurality of locking pills 430 are forced outward by the spindle 420 into a locking position (as in FIG. 4) or a position where the locking pills 430 can retract back into the piston 410 to release the retainer cavity 450.

The spindle 420 as shown in FIG. 4 is actuated via pneumatic pressure supplied to a lower end 422, but other types of spindle actuation are also possible. Furthermore, the spindle 420 is designed to be actuated upward (from the position shown in FIG. 4) in order to move a flared section 424 out of contact with the pills 430 and allow the pills 430 to retract back into the piston 410. Again, other designs of the spindle 420 are possible.

Figure 5:
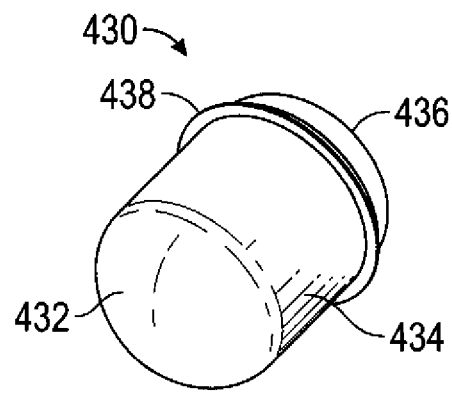
FIG. 5 is an illustration of one of the locking pills from the fastener of FIG. 4, where the shape of the locking pill is clearly visible.

FIG. 5 is an illustration of one of the locking pills 430 from the fastener 400 of FIG. 4, where the shape of the locking pill 430 is clearly visible. The following discussion refers to features and elements which are visible in FIGS. 4 and/or 5.

The locking pill 430 has a shape which may be described as two hemispheres joined by a cylinder of the same diameter. Specifically, the pill 430 includes a first end 432 which is generally hemispherical in shape. The first end 432 may also be flattened somewhat into an ellipsoid shape rather than a true hemisphere. The first end 432 is the end of the pill 430 that engages with a mating surface 452 of the retainer cavity 450. The pill 430 also includes a cylindrical center section 434, in the shape of a circular cylinder. The cylindrical section 434 provides for smooth translation and full travel of the pill 430 in deployment and retraction. The pill 430 further includes a second end 436, which may be hemispherical or ellipsoid in shape, or more of a "flattened ellipsoid" as shown in FIG. 4. The second end 436 is the end of the pill 430 that contacts the spindle 420. The shape of the locking pill 430 provides two distinct advantages over the traditional round lock ball shape.

First, the locking pill 430 possesses greater shear strength and a larger contact surface than a corresponding round lock ball. The increased strength factors of the pill 430 are due both to its increased height relative to diameter in the ellipsoid shape of the first end 432, and to the fact that the pill 430 can be deployed so that all of the first end 432 is outside the piston 410, as shown in FIG. 4. In contrast, more than 50% of a traditional round lock ball must necessarily remain inside the piston wall, because round lock balls must be externally staked or otherwise restrained from ejection. Shear strength and contact surface area of the locking pills 430 can be important in applications where the separation loads on the retainer cavity 450 are large, as may be the case in aircraft access panels. Under high loads, traditional round lock balls have been known to deform or completely fail in shear, thus allowing an unintended release of the retainer cavity 450 and its associated panel. The increased contact surface area and shear strength of the elongated locking pills 430 addresses this limitation of traditional round lock balls.

Second, the locking pills 430 cannot rotate within their position in the wall of the piston 410. The inability to rotate is due to the unique shape of the locking pill 430—particularly its inclusion of the cylindrical section 434, which facilitates smooth translational deployment and retraction of the pill 430 in a radial direction, but prevents rotation of the pill 430 about a vertical or circumferential axis. The inability to rotate makes the locking pill 430 more effective in withstanding separation loads by the retainer cavity 450, as rotation of traditional round lock balls has been known to cause the round lock balls to roll out of engagement with the retainer cavity 450 which they are supposed to be locking in place.

In addition, the locking pill 430 includes a shoulder 438 which fits into a recess 412 in an inner wall of the piston 410. The shoulder 438 provides a positive mechanical stop which prevents accidental ejection of the pills 430 from the piston 410. The countersunk shoulder feature was conceived as an alternative to traditional lock ball staking which has proved to be an unreliable method, often causing pill jamming inside the bore, and also limiting deployment travel as discussed above. The combination of features of the locking pills 430—including the elongated shape, the cylindrical section 434 and the shoulder 438—result in the fastener 400 having greater strength and better reliability than traditional round lock-ball fasteners.

FIG. 6 is a cross-sectional illustration of an upper end of a fastener 500, similar to the fastener 100 shown in FIG. 3. The fastener 500 includes a piston 510 and a retainer cavity 550, and the piston 510 does not include a spindle or wedge for mechanical pill actuation. The piston 510 has an axial bore 512 through which pneumatic pressure is provided (at an appropriate stage of fastener actuation) to inner faces of a plurality of locking pills 530. The locking pills 530 travel in a lateral direction (deploying radially outward and retracting radially inward) in a cross-bore 514 of the piston 510. The retainer cavity 550 includes a ridge 552 on an inner lip, where the ridge 552 has a shape corresponding to a flared-end profile of the locking pills 530.

Legacy ball locking components are subject to misalignments and can easily dislodge if the balls are not perfectly engaged. In the aircraft industry, this could cause undesirable consequences, thereby making the traditional ball locking fastener inadequate for use. In contrast, the mating shape of the ridge 552 and the pills 530 is resistant to slipping and vibrations, and is self-centering and self-reinforcing. The ridge 552 allows for positive retention of the locking pills 530 in a locked position without need for a "wedge" or "spindle", and thereby reduces the overall diameter of the fastener. The ridge 552 in the retainer cavity 550 enables the pills 530 to be engaged and locked in a specific pneumatic sequence, as discussed previously. Once locked, the ridge 552 holds the fastener locked without further need for pneumatic pressure.

FIG. 7 is a cross-sectional illustration of the upper end of the fastener 500 of FIG. 6, in a locked configuration where the locking pills 530 have deployed outward and engaged with the ridge 552 on the inner lip of the retainer cavity 550. In FIG. 7, it is clearly visible how the locking pills 530 engage with the ridge 552 on the retainer cavity 550—which both prevents unintended retraction of the pills 530 into the piston 510, and creates a positive locking of the retainer cavity 550 on the pills 530 which is only reinforced by vertical loads on the retainer cavity 550.

A key attribute of the fastener 500 and the other fasteners discussed above is the ability to control movement of the locking pills 530 under all circumstances. Specifically, it is vital that the locking pills 530 do not eject from the piston 510 if the pills 530 are inadvertently deployed when the retainer cavity 550 is not in place. It is also critical that the pills 530 do not retract in an off-center fashion, where one of the pills 530 protrudes out of the wall of the piston 510 and interfere with the retainer cavity 550.

Furthermore, it is imperative that the pills 530 retract back into the piston 510 on their own when the fastener 500 is being unlatched, as no inward-urging by the retainer cavity 550 is possible because of the ridge 552. As discussed above, in the fastener 500, deployment of the locking pills 530 is accomplished with pneumatic pressure as an alternative to a mechanical spindle. In this design, other features can be added to the locking pills 530 to ensure reliable deployment and retraction of the pills 530 under all circumstances.

FIG. 8 is an illustration of one of the locking pills 530 from the fastener 500 of FIGS. 6 and 7, where the locking pill 530 includes a magnetic retraction feature, and a pin/slot feature in the top of the locking pill 530 to control operational travel. The following discussion refers to elements which are visible in one or more of FIGS. 6, 7 and/or 8.

A pair of pins 516 are fitted in a fixed position in a top portion of the piston 510, such that the pins 516 protrude down into the cross-bore 514. Additionally, a track 532 in the shape of a slot is provided in a top surface of the locking pills 530, where the track 532 slides back and forth over the pin 516 to provide a means to limit the operational travel of the pills 530. That is, the track 532 has a length and a position designed to limit both the deployment travel (radially outward from the piston 510) and the retraction travel (radially inward) of the pill 530 via contact with the pin 516. This pin/slot feature prevents the pills 530 from being ejected out of the cross-bore 514 in case of an inadvertent pill deployment, as a first end 534 of the track 532 contacts the pin 516. The pin/slot feature also prevents the pills 530 from retracting off center where one of the pills 530 would still be protruding from the piston 510, as each of the pills 530 will retract until a second end 536 of the track 532 contacts the pin 516. The pin/slot feature was conceived as another alternative to traditional lock ball staking, which often causes pill jamming inside the bore. The pin 516 captured within the slot-shaped track 532 facilitates more reliable retention of the pills while maintaining free movement and any required amount of travel.

Positive, reliable retraction of the locking pills 530 can be achieved with the use of magnets 540 placed into the rear of the pills 530. When the locking pills 530 are not engaged with the ridge 552, and no pneumatic pressure is supplied in the axial bore 512, the magnets 540 cause the pills 530 to retract back into the piston 510. The magnets 540 are oriented in the locking pills 530 so that the magnets 540 are attracted to each other. The magnets 540 may be composed of any suitable magnetic material, including "rare earth" compositions such as neodymium-iron-boron. As discussed above, the pin/slot feature causes each of the pills 530 to retract back to its proper position, thereby preventing an off-center retraction condition. In conjunction with the self-locking retention geometry provided by the ridge 552, the magnet retraction and pin/slot features eliminate the need for a spindle to deploy/retract the pills 530. Elimination of the spindle is beneficial because the spindle is an element which in traditional ball-lock fastener designs is inherently prone to malfunction, tends to weaken and wear with continuous use, and drives a larger overall fastener size.

The fastener system described above provides numerous advantages to manufacturers of aircraft and other vehicles or machines which use such fasteners for access panels or other applications. These advantages include improvements in the reliability, repeatability and strength of the locking mechanism, by virtue of features including the shape of the locking balls, the shape of the retention housing which engages the locking balls, and mechanisms for controlling deployment and retraction of the locking balls. The innovative features of the disclosed fastener system result in a fastener of reduced size and increased capability which can be used in applications where traditional ball-lock fasteners are not suitable.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fastener system comprising:
    a cylindrical piston slidably mounted to a first structure, where the piston is fully retractable into the first structure and deployable outward a fixed distance from the first structure, and the piston includes an axial bore opening to a plurality of radial cross-bores proximal a top end of the piston;
    a plurality of locking pills having inner and outer ends, each of a respective one of said locking pills slidably disposed in a corresponding respective one of the cross-bores of the piston, where the locking pills are configured to travel from a first position in which the pills are situated radially inward and entirely within the piston to a second position where the pills are deployed radially outward where the outer ends extend beyond an outer surface of the piston; and
    a retainer cavity mounted on a lower surface of a second structure such that an opening of the cavity faces toward the first structure to receive the piston, where the retainer cavity includes an undercut surface on an inner lip,
    where the fastener system latches the second structure to the first structure via a latching sequence including placing the second structure adjacent the first structure, deploying the piston outward from the first structure in a substantially linear-only sliding motion of the piston into the retainer cavity in the second structure, deploying the locking pills radially outward to the second position, and mechanically restraining the locking pills in the second position such that the locking pills cannot retract to the first position and the locking pills contact the undercut surface of the retainer cavity to latch the second structure to the first structure,
    wherein a spindle is provided in the axial bore of the piston, where the spindle is axially slidable to a locking position in which a larger diameter portion of the spindle contacts the inner end of the locking pills and mechanically forces the locking pills to deploy radially outward to the second position, and the spindle is slidable to an unlocking position in which a smaller diameter portion of the spindle is aligned with the cross-bores of the piston and the locking pills are thereby free to retract radially inward to the first position before the inner ends of the locking pills contact the spindle.

2. The fastener system of claim 1 wherein pneumatic pressure is selectively supplied via the axial bore in the piston to cause the locking pills to deploy radially outward to the second position.

3. The fastener system of claim 1 wherein:
    the locking pills have a circular cross-sectional shape, a cylindrical center section between the inner and outer ends, a rounded shape of the outer end, and a shoulder proximal the inner end, where the shoulder exceeds a diameter of the cylindrical center section; and
    the retainer cavity has a contact surface around an inner circumference, and the contact surface has a profile shape which corresponds to the rounded shape of the outer end of the locking pills,
    where the outer ends of the locking pills engage with the contact surface of the retainer cavity to lock the second structure to the first structure when the locking pills are forced outward to the second position by the spindle, the contact surface of the retainer cavity forces the locking pills inward to the first position when the spindle is in the unlocking position and the second structure is pulled away from the first structure, and the shoulder on the locking pills contacts an inner wall of the piston and prevents the locking pills from ejecting outward from the cross-bores.

4. The fastener system of claim 3 wherein the rounded shape of the outer end of the locking pills is a hemispherical shape.

5. The fastener system of claim 3 wherein the rounded shape of the outer end of the locking pills is an ellipsoid shape.

6. The fastener system of claim 1 wherein the first structure is an aircraft and the second structure is an access panel, where the access panel must be attached to the aircraft when the aircraft is operational, and the access panel is removable from the aircraft for inspection or service.

7. The fastener system of claim 6 wherein at least three of the fastener systems are used to attach the access panel to the aircraft, and the access panel has a curvature which necessitates complete retraction of the piston into the aircraft prior to placing the access panel adjacent to the aircraft.

8. A fastener system comprising:
    a cylindrical piston slidably mounted to a first structure, where the piston is fully retractable into the first structure and deployable outward a fixed distance from the first structure, and the piston includes an axial bore opening to a plurality of radial cross-bores proximal a top end of the piston;
    a plurality of locking pills having inner and outer ends, each of a respective one of said locking pills slidably disposed in a corresponding respective one of the cross-bores of the piston, where the locking pills are configured to travel from a first position in which the pills are situated radially inward and entirely within the piston, to a second position where the pills are deployed radially outward where the outer ends extend beyond an outer surface of the piston, and a shoulder on the pills exceeding a diameter of the cross-bores prevents the pills from deploying past the second position; and a spindle provided in the axial bore of the piston, where the spindle is axially slidable to a locking position in which a larger diameter portion of the spindle contacts the inner end of the locking pills and mechanically forces the locking pills to deploy radially outward to the second position, and the spindle is slidable to an unlocking position in which a smaller diameter portion of the spindle is aligned with the cross-bores of the piston and the locking pills are thereby, free to retract radially inward to the first position before the inner ends of the locking pills contact the spindle;

a retainer cavity mounted on a lower surface of a second structure such that an opening of the cavity faces toward the first structure to receive the piston, where the retainer cavity includes an undercut surface on an inner lip, where the fastener system latches the second structure to the first structure via a latching sequence including placing the second structure adjacent the first structure, deploying the piston outward from the first structure in a substantially linear-only sliding motion of the piston into the retainer cavity in the second structure, and sliding the spindle to the locking position to deploy the locking pills radially outward to the second position and mechanically restrain the locking pills in the second position such that the locking pills cannot retract to the first position, and the locking pills contact the undercut surface of the retainer cavity to latch the second structure to the first structure.

9. The fastener system of claim 8 wherein:

the locking pills have a circular cross-sectional shape, a cylindrical center section between the inner and outer ends, a rounded shape of the outer end, and the shoulder is proximal the inner end; and the retainer cavity has a contact surface around an inner circumference, and the contact surface has a profile shape which corresponds to the rounded shape of the outer end of the locking pills, where the outer ends of the locking pills engage with the contact surface of the retainer cavity to lock the second structure to the first structure when the locking pills are forced outward to the second position by the spindle, the contact surface of the retainer cavity forces the locking pills inward to the first position when the spindle is in the unlocking position and the second structure is pulled away from the first structure, and the shoulder on the locking pills contacts an inner wall of the piston and prevents the locking pills from ejecting outward from the cross-bores.

10. The fastener system of claim 9 wherein pneumatic pressure is selectively supplied via the axial bore in the piston to cause the locking pills to deploy radially outward to the second position.

11. The fastener system of claim 9 wherein the rounded shape of the outer end of the locking pills is an ellipsoid shape.

12. The fastener system of claim 9 wherein the rounded shape of the outer end of the locking pills is a hemispherical shape.

13. The fastener system of claim 9 wherein the first structure is an aircraft and the second structure is an access panel, where the access panel must be attached to the aircraft when the aircraft is operational, and the access panel is removable from the aircraft for inspection or service.

14. The fastener system of claim 13 wherein at least three of the fastener systems are used to attach the access panel to the aircraft, and the access panel has a curvature which necessitates complete retraction of the piston into the aircraft prior to placing the access panel adjacent to the aircraft.

\* \* \* \* \*